W. C. SCHUMPERT.
NUT LOCK.
APPLICATION FILED JUNE 17, 1910.
976,701.  Patented Nov. 22, 1910.
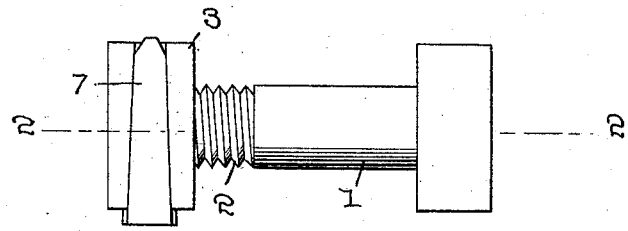
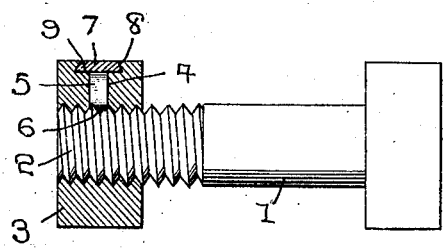
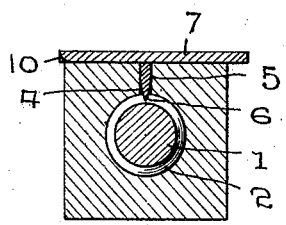  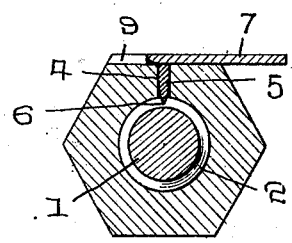
WITNESSES:
INVENTOR
W. C. Schumpert
BY
W. J. Fitzgerald
Attorneys

UNITED STATES PATENT OFFICE.

WILLIAM C. SCHUMPERT, OF CHATTANOOGA, OKLAHOMA.

NUT-LOCK.

976,701.　　　　　Specification of Letters Patent.　　Patented Nov. 22, 1910.

Application filed June 17, 1910.　Serial No. 567,469.

*To all whom it may concern:*

Be it known that I, WILLIAM C. SCHUMPERT, a citizen of the United States, residing at Chattanooga, in the county of Comanche and State of Oklahoma, have invented certain new and useful Improvements in Nut-Locks; and I do hereby declare the following to be a full, clear, and exact description of the invention, such as will enable others skilled in the art to which it appertains to make and use the same.

My invention relates to new and useful improvements in nut locks and my object is to provide a mandrel, which is adapted to be forced into engagement with the teeth of the bolt to hold the nut against rotation on the bolt, and, a further object is to provide means for forcing the mandrel into engagement with the bolt.

Other objects and advantages will be hereinafter referred to and more particularly pointed out in the specification hereunto annexed.

In the accompanying drawings which are made a part of this application, Figure 1 is a plan view of the bolt showing the nut locked in position thereon. Fig. 2 is a sectional view as seen on line 2—2 Fig. 1. Fig. 3 is a transverse sectional view through the nut and bolt, and, Fig. 4 is a similar view of a modified form of nut.

Referring to the drawings in which similar reference numerals designate corresponding parts throughout the several views, 1 indicates a bolt, which may be constructed in any preferred manner and having threads 2 at one end thereof and 3 indicates a nut, which is adapted to be secured on to the threaded portion of the bolt. In order to hold the nut against rotation on the bolt, an opening 4 is extended inwardly from one face of the nut and intersects the opening in the nut and through said opening is introduced a mandrel 5, the lower end of which is provided with a point 6, which is adapted to be forced into the threads of the bolt. The mandrel is forced into engagement with the threads of the bolt by means of a wedge 7, the edges of which are beveled to engage the beveled edges 8 of a channel 9, said channel extending transversely of the nut from edge to edge thereof. The side walls of the channel are preferably tapered from one end to the other, as is also the wedge 7, so that when the wedge is first introduced into the slot, it may be raised sufficiently to extend over the upper end of the mandrel, which before being forced into the threads, projects slightly above the bottom of the channel. It will be seen, however, that as the wedge is forced lengthwise through the channel, the beveled edge walls thereof will force the wedge downwardly and drive the mandrel into the teeth, thus securely locking the nut in position on the bolt.

In Figs. 1 to 3 of the drawings, I have shown the locking device applied to a square nut, while in Fig. 4, I have shown the same applied to a hexagonal nut, but it will be understood that it can be used in connection with nuts having various contours.

In order to guard against the end of the wedge engaging the projecting portion of the mandrel, the end of the wedge coming in engagement with the mandrel is preferably tapered on its under surface, as shown at 10, so that the wedge will readily ride over the mandrel, when the end of the wedge is moved into engagement therewith.

The point 6 of the mandrel is of sufficient width to extend into engagement with two of the threads and the mandrel is of such length that, when forced downwardly its full distance, the point 6 will cut its way into the threads and form a positive seat, thereby guarding against any possibility of the nut rotating on the bolt until the wedge and mandrel have been removed therefrom.

What I claim is:—

1. In a nut lock, the combination with a bolt having threads at one end and a nut adapted to fit on said bolt, said nut having an opening therein, a channel extending transversely of the nut and intersecting said opening, the walls of said channel being tapered and gibbed, of a tapered wedge having its edges beveled to coöperate with the gib of the channel, a mandrel having a pointed end adapted to be seated in the opening of said nut, and a tapered portion formed on the under face of one edge of said wedge, said tapered portion causing the wedge to ride over the projecting end of the mandrel as said wedge is moved inwardly and forcing the pointed end of said mandrel into engagement with the threads of the bolt.

2. In a nut lock, the combination with a bolt having threads at one end and a nut adapted to fit on said bolt, said nut having an opening therein, a channel extending transversely of the nut and intersecting said opening, of a wedge having edges formed to slidably secure it in said channel, a mandrel having a pointed end adapted to be seated in the opening of the nut and a tapered portion formed on the under face of one of the free edges of said wedge, said tapered portion being adapted to ride over the projecting end of the mandrel as said wedge is moved inwardly and force said mandrel into engagement with the threads of said bolt.

In testimony whereof I have signed my name to this specification in the presence of two subscribing witnesses.

WILLIAM C. SCHUMPERT.

Witnesses:
C. H. HOWARD,
TOMMIE SCHUMPERT.